United States Patent
Diamond et al.

(10) Patent No.: US 11,386,726 B2
(45) Date of Patent: Jul. 12, 2022

(54) ENHANCED COLLISION DETECTION

(71) Applicant: Ford Global Technologies, LLC, Dearborn, MI (US)

(72) Inventors: Brendan Diamond, Grosse Pointe, MI (US); Erik J. Christen, Royal Oak, MI (US); Matthew Joseph, Saint Clair Shores, MI (US); Shehan Haputhanthri, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 377 days.

(21) Appl. No.: 16/576,454

(22) Filed: Sep. 19, 2019

(65) Prior Publication Data
US 2021/0090357 A1   Mar. 25, 2021

(51) Int. Cl.
*G07C 5/08*       (2006.01)
*B60W 30/095*   (2012.01)
*G08G 1/16*       (2006.01)

(52) U.S. Cl.
CPC ....... *G07C 5/0808* (2013.01); *B60W 30/0956* (2013.01); *G07C 5/0841* (2013.01); *G08G 1/162* (2013.01); *B60W 2530/10* (2013.01); *B60W 2554/00* (2020.02); *B60W 2554/80* (2020.02); *B60W 2556/45* (2020.02)

(58) Field of Classification Search
None
See application file for complete search history.

(56) References Cited

U.S. PATENT DOCUMENTS

| 5,492,207 A | * | 2/1996 | Clausen | F16F 7/123 |
| | | | | 188/377 |
| 9,174,598 B2 | | 11/2015 | Harada et al. | |
| 9,701,307 B1 | * | 7/2017 | Newman | B60W 10/184 |
| 10,407,014 B2 | * | 9/2019 | Ghannam | G08G 1/166 |
| 2015/0039397 A1 | * | 2/2015 | Fuchs | G07C 5/008 |
| | | | | 705/7.35 |

(Continued)

FOREIGN PATENT DOCUMENTS

| DE | 102011115875 A1 * | 4/2013 | ......... B60R 21/0132 |
| DE | 102014006071 A1 | 10/2015 | |

(Continued)

OTHER PUBLICATIONS

Machine translation of DE102011115875A1 (Year: 2022).*

*Primary Examiner* — Aniss Chad
*Assistant Examiner* — Jennifer M Anda
(74) *Attorney, Agent, or Firm* — Frank A. MacKenzie; Bejin Bieneman PLC

(57) ABSTRACT

A computer includes a processor and a memory, the memory storing instructions executable by the processor to predict damage to one or more components of a host vehicle and predict a hazard for a user of the host vehicle based on the predicted damage of at least one of the components disposed at the collision location. The computer predicts the damage based on an energy transfer between a target vehicle and the host vehicle. The energy transfer is based on a speed of a target vehicle, a mass of the target vehicle, a predicted contact area of a collision location of the host vehicle where the target vehicle is predicted to collide, and a deformation strength of material at the collision location.

16 Claims, 3 Drawing Sheets

(56) References Cited

U.S. PATENT DOCUMENTS

2016/0050356 A1\* 2/2016 Nalepka ............ G06K 9/00791
                                                        348/148
2018/0126983 A1\* 5/2018 Beauvais ............. B60W 10/04
2020/0334928 A1\* 10/2020 Bourke ................ G06Q 40/08

FOREIGN PATENT DOCUMENTS

DE      102016209309 A1   12/2016
GB          2528477 A  \*  1/2016  ............ G07C 5/008
KR         101956685 B1    3/2019

\* cited by examiner

ENHANCED COLLISION DETECTION

BACKGROUND

Vehicle collisions can occur at intersections, such as between a stationary vehicle at an intersection and a target approaching the vehicle from behind. Vehicles typically include one or more systems to detect collisions. For example, a vehicle may include sensors to detect nearby targets that may be collision threats.

DETAILED DESCRIPTION

Figure 1:
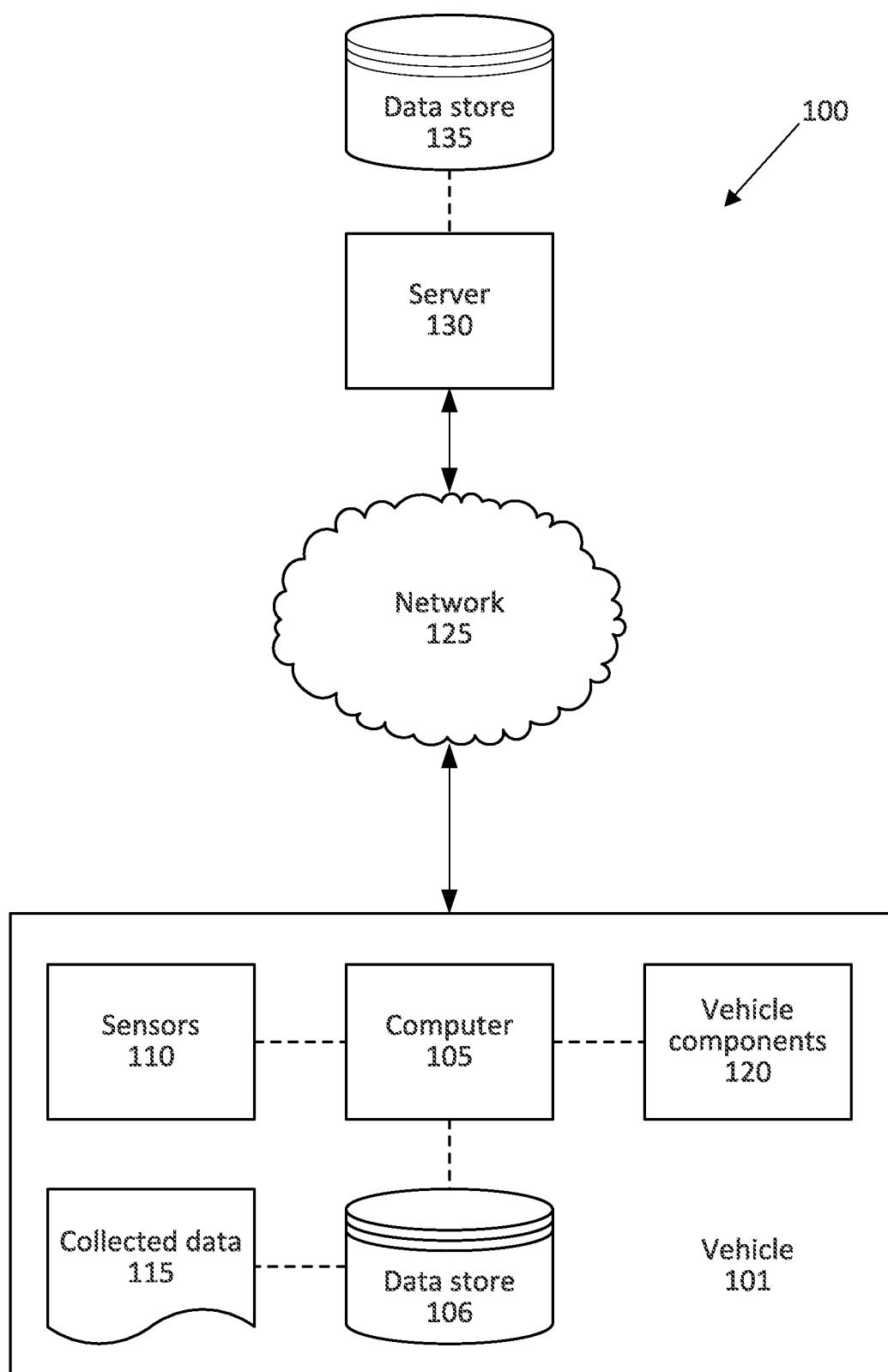
FIG. 1 is a block diagram of an example system for collision detection.

A computer includes a processor and a memory, the memory storing instructions executable by the processor to predict damage to one or more components of a host vehicle based on an energy transfer between a target vehicle and the host vehicle and predict a hazard for a user of the host vehicle based on the predicted damage of at least one of the components disposed at the collision location. The energy transfer is based on a speed of a target vehicle, a mass of the target vehicle, a predicted contact area of a collision location of the host vehicle where the target vehicle is predicted to collide, and a deformation strength of material at the collision location.

The instructions can further include instructions to identify the hazard as one of a slip hazard, a fire hazard, an electrocution hazard, or a respiratory hazard.

The instructions can further include instructions to identify the slip hazard upon identifying that one of the damaged components includes a lubricant, to identify the fire hazard upon identifying that one of the damaged components includes a combustible substance, to identify the electrocution hazard upon identifying that one of the damaged components is a battery, and to identify the respiratory hazard upon identifying that one of the damaged components includes a volatile chemical.

The instructions can further include instructions to identify a size of the target vehicle and to predict the damage based on the size of the target vehicle.

The instructions can further include instructions to send a message indicating the predicted damage and the predicted hazard to a server.

The instructions can further include instructions to generate a list of one or more components to repair based on the predicted damage at the collision location.

The instructions can further include instructions to predict the damage based on a shape of a vehicle body at the collision location.

The instructions can further include instructions to predict the damage based on a number of layers of material of a vehicle body at the collision location.

The instructions can further include instructions to identify the target vehicle based on image data collected by a camera of the host vehicle and to determine the mass of the target vehicle based on the identification.

The instructions can further include instructions to predict a penetration depth of the target vehicle based on the energy transfer.

The instructions can further include instructions to collect image data of cargo in the host vehicle and to identify the hazard based on the cargo.

The instructions can further include instructions to determine a deformation characteristic based on a number of layers of material of a vehicle body at the collision location, a yield strength of the material, a ductility of the material, and a shape of the vehicle body at the collision location, and to predict the damage based on the deformation characteristic.

The instructions can further include instructions to predict a damage severity based on a difference in a speed of the host vehicle and the speed of the target vehicle, the predicted contact area of a collision location of the host vehicle where the target vehicle is predicted to collide, and the mass of the target vehicle, and to predict a penetration depth of the target vehicle based on the deformation characteristic and the damage severity.

The instructions can further instructions to identify one or more damaged components based on the penetration depth.

A method includes predicting damage to one or more components of a host vehicle based on an energy transfer between a target vehicle and the host vehicle and predicting a hazard for a user of the host vehicle based on the predicted damage of at least one of the components disposed at the collision location. The energy transfer is based on a speed of a target vehicle, a mass of the target vehicle, a predicted contact area of a collision location of the host vehicle where the target vehicle is predicted to collide, and a deformation strength of material at the collision location.

The method can further include identifying the hazard as one of a slip hazard, a fire hazard, an electrocution hazard, or a respiratory hazard.

The method can further include identifying the slip hazard upon identifying that one of the damaged components includes a lubricant, identifying the fire hazard upon identifying that one of the damaged components includes a combustible substance, identifying the electrocution hazard upon identifying that one of the damaged components is a battery, and identifying the respiratory hazard upon identifying that one of the damaged components includes a volatile chemical.

The method can further include identifying a size of the target vehicle and predicting the damage based on the size of the target vehicle.

The method can further include sending a message indicating the predicted damage and the predicted hazard to a server.

The method can further include generating a list of one or more components to repair based on the predicted damage at the collision location.

The method can further include predicting the damage based on a shape of a vehicle body at the collision location.

The method can further include predicting the damage based on a number of layers of material of a vehicle body at the collision location.

The method can further include identifying the target vehicle based on image data collected by a camera of the host vehicle and determining the mass of the target vehicle based on the identification.

The method can further include predicting a penetration depth of the target vehicle based on the energy transfer.

The method can further include collecting image data of cargo in the host vehicle and to identify the hazard based on the cargo.

The method can further include determining a deformation characteristic based on a number of layers of material of a vehicle body at the collision location, a yield strength of the material, a ductility of the material, and a shape of the vehicle body at the collision location, and to predict the damage based on the deformation characteristic.

The method can further include predicting a damage severity based on a difference in a speed of the host vehicle and the speed of the target vehicle, the predicted contact area of a collision location of the host vehicle where the target vehicle is predicted to collide, and the mass of the target vehicle, and to predict a penetration depth of the target vehicle based on the deformation characteristic and the damage severity.

The method can further include identifying one or more damaged components based on the penetration depth.

A system includes a host vehicle including a plurality of components, means for predicting damage to one or more of the components based on an energy transfer between a target vehicle and the host vehicle, the energy transfer based on a speed of a target vehicle, a mass of the target vehicle, a predicted contact area of a collision location of the host vehicle where the target vehicle is predicted to collide, and a deformation strength of material at the collision location, and means for predicting a hazard for a user of the host vehicle based on the predicted damage of at least one of the components disposed at the collision location.

The system can further include means for identifying the hazard as one of a slip hazard, a fire hazard, an electrocution hazard, or a respiratory hazard.

The system can further include means for predicting a penetration depth of the target vehicle based on the energy transfer.

Further disclosed is a computing device programmed to execute any of the above method steps. Yet further disclosed is a vehicle comprising the computing device. Yet further disclosed is a computer program product, comprising a computer readable medium storing instructions executable by a computer processor, to execute any of the above method steps.

Predicting specific components that may be damaged in a collision allows for identification of the components for repair and hazards. That is, the damaged components can generate hazards that users such as users of the vehicle, emergency services providers, and repair technicians should avoid. A computer of the vehicle can predict the damage to the components using a kinematic model to predict an energy transfer between a target vehicle and the vehicle during the collision. Upon predicting the damage to the components and the hazards, the computer can transmit a message including the predicted damage and hazards to a central server that can be accessed by users to avoid hazards and repair the components.

FIG. 1 illustrates an example system 100 for collision detection. A computer 105 in the vehicle 101 is programmed to receive collected data 115 from one or more sensors 110. For example, vehicle 101 data 115 may include a location of the vehicle 101, data about an environment around a vehicle, data about an object outside the vehicle such as another vehicle, etc. A vehicle 101 location is typically provided in a conventional form, e.g., geo-coordinates such as latitude and longitude coordinates obtained via a navigation system that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a conventional vehicle 101 communications bus. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 can be of any type, e.g., hard disk drives, solid state drives, servers, or any volatile or non-volatile media. The data store 106 can store the collected data 115 sent from the sensors 110.

Sensors 110 can include a variety of devices. For example, various controllers in a vehicle 101 may operate as sensors 110 to provide data 115 via the vehicle 101 network or bus, e.g., data 115 relating to vehicle speed, acceleration, position, subsystem and/or component status, etc. Further, other sensors 110 could include cameras, motion detectors, etc., i.e., sensors 110 to provide data 115 for evaluating a position of a component, evaluating a slope of a roadway, etc. The sensors 110 could, without limitation, also include short range radar, long range radar, LIDAR, and/or ultrasonic transducers.

Collected data 115 can include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 can include a plurality of vehicle components 120. In this context, each vehicle component 120 includes one or more hardware components adapted to perform a mechanical function or operation—such as moving the vehicle 101, slowing or stopping the vehicle 101, steering the vehicle 101, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, a movable seat, and the like.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105. A semi-autonomous mode is one in which at least one of vehicle 101 propulsion (typically via a powertrain including an electric motor and/or internal combustion engine), braking, and steering are controlled at least partly by the computer 105 as opposed to a human operator. In a non-autonomous mode, i.e., a manual mode, the vehicle 101 propulsion, braking, and steering are controlled by the human operator.

The system 100 can further include a network 125 connected to a server 130 and a data store 135. The computer 105 can further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 2:
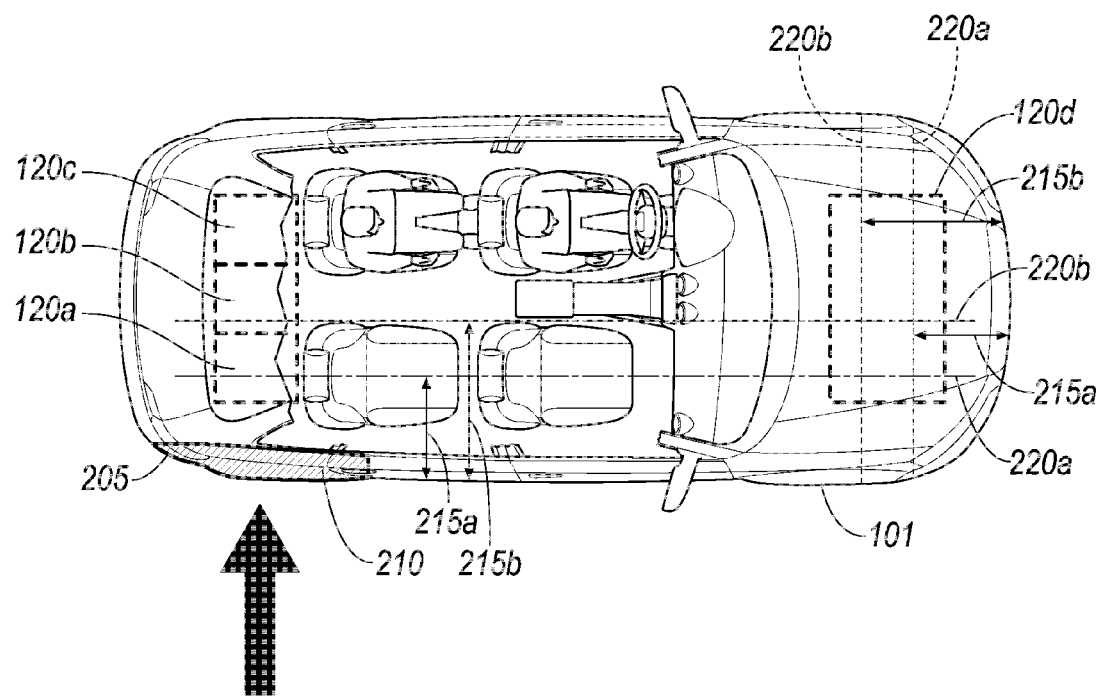
FIG. 2 is a plan view of a host vehicle and a target vehicle.
Figure 2:
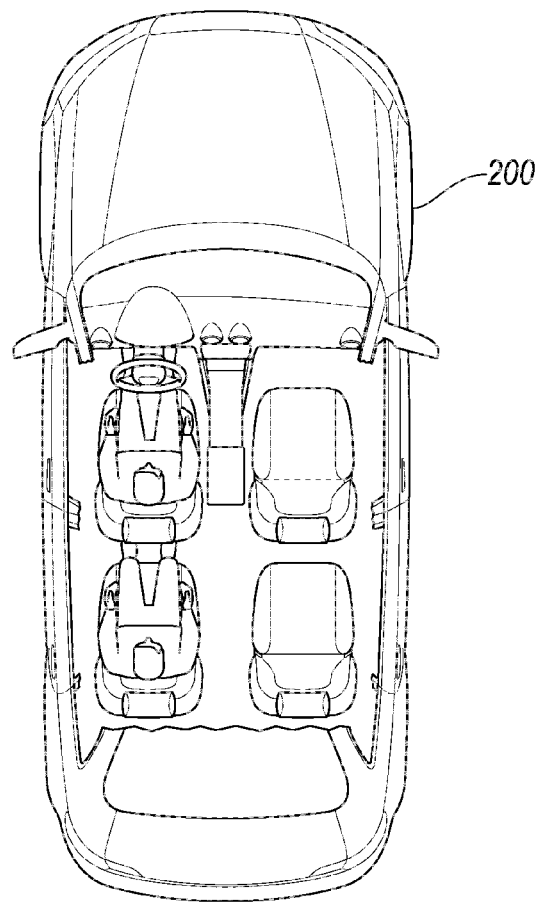

FIG. 2 is a plan view of a host vehicle 101 and a target vehicle 200. The target vehicle 200 is moving toward the host vehicle 101. The computer 105 can predict damage from a collision between the host vehicle 101 and the target vehicle 200. FIG. 2 shows the host vehicle 101 including four exemplary components 120a, 120b, 120c, 120d, and the host vehicle 101 can include a different number of components 120. The components 120 are positioned throughout the host vehicle 101. For example, the components 120a, 120b, 120c can be disposed toward a rear end of the host vehicle 101 and can be, e.g., a fuel tank, a fuel line, etc. In another example, the component 120d can be disposed toward a front end of the host vehicle 101 and can be, e.g., a propulsion.

The host vehicle 101 has a body 205. The body 205 may be of a unibody construction. In the unibody construction, the body 205 is unitary, i.e., a continuous one-piece unit, and includes a subframe. As another example not shown in the Figures, the body 205 and a frame may have a body-on-frame construction (also referred to as a cab-on-frame construction). In other words, the body 205 and the frame are separate components, i.e., are modular, and the body 205 is supported on and affixed to the frame. Alternatively, the body 205 and the frame may have any suitable construction. The body 205 and/or the frame may be formed of any suitable material, for example, steel, aluminum, etc. During the collision, the body 205 absorbs energy from the target vehicle 200.

The computer 105 can identify the target vehicle 200. The computer 105 can actuate one or more sensors 110 to collect data 115 about the target vehicle 200. For example, the computer 105 can actuate a camera 110 to collect image data 115 about the target vehicle 200. Alternatively or additionally, the computer 105 can receive data 115 about the target vehicle 200 over the network 120, e.g., through V2V communications. Based on the collected data 115, the computer 105 can identify the target vehicle 200. For example, the computer 105 can compare images of the target vehicle 200 to stored images of vehicles using an image-recognition algorithm, e.g., Canny edge detection, to identify the target vehicle 200.

The computer 105 can identify the target vehicle 200 based on identified features of the target vehicle 200. In this context, a "feature" of the target vehicle 200 is a portion of the target vehicle 200 that can be used to identify the target vehicle 200, e.g., a grill, a brand marking, and exterior component such as a bumper, etc. Upon identifying the target vehicle 200 based on the features, the computer 105 can refer to stored data 115 in the data store 106 and/or the server 130 that describe parameters of the identified target vehicle 200. For example, the data 115 can include, e.g., a size, a mass, a material composition, etc., of the target vehicle 200. In this context, a "size" of the target vehicle 200 is a length of the target vehicle 200 and a width of the target vehicle 200. Based on the size, the computer 105 can predict the damaged to the host vehicle 101. For example, the computer 105 can use the width of the target vehicle 200 to predict a contact area of a collision location on the host vehicle 101. Identifying the specific target vehicle 200 allows the computer 105 to incorporate additional data 115 about the target vehicle 200 to determine the energy transfer, such as the target vehicle 200 size, shape, mass, etc.

The computer 105 can predict damage to one or more components 120 of the host vehicle 101 based on an energy transfer between the target vehicle 200 and the host vehicle 101. The computer 105 can predict the energy transfer based on a speed of the target vehicle 200 and a mass of the target vehicle 200. For example, the computer 105 can predict the energy transfer based on a relative speed between the target vehicle 200 and the host vehicle 101. That is, as described below, the computer 105 can predict an amount of energy transferred from the target vehicle 200 to the host vehicle 101 resulting from a predicted collision. The energy transfer can be represented with a deformation characteristic and a damage severity, as described below. The deformation characteristic represents energy absorbed by deforming material of the host vehicle 101. The damage severity represents energy transferred to kinetic energy of the host vehicle 101.

The computer 105 can predict a contact area of a collision location 210 of the host vehicle 101 where the target vehicle 200 is predicted to collide. The contact area is an area of a surface of the host vehicle 101 at the predicted collision location 210. The computer 105 can predict the contact area based on the size of the target vehicle 200 approaching the host vehicle 101. For example, as shown in FIG. 2, the target vehicle 200 is approaching the host vehicle 101 substantially perpendicularly, and the computer 105 can predict the contact area as the width of the target vehicle 200 and a height above the ground of the target vehicle 200.

The computer 105 can predict the damage based on a shape of the vehicle body 205 at the collision location 210. In this context, a "shape" of the vehicle body 205 is a set of dimensions including at least a length, a width, a cross-section, and a material thickness that can affect deformation during a collision. That is, the vehicle body 205 can have different shapes at different parts of the vehicle body 205, e.g., the vehicle body 205 can have a greater thickness near one of the pillars, the vehicle body 205 can have a substantially rectangular cross section near a rocker panel, etc. The computer 105 can input the shape of the vehicle body 205 to conventional material deformation algorithms to predict the damage. By incorporating the specific shape of the vehicle body 205, the computer 105 can more accurately predict the damage to the host vehicle 101. The computer 105 can determine a nondimensional factor s based on the shape of the vehicle body 205. The nondimensional factor s accounts for a curvature of the surface of the vehicle body 205 and a deflection-to-force correlation normalized to a reference portion of the vehicle body 205. That is, the vehicle body 205 can be represented as a plurality of 2-dimensional slices of a 3 dimensional contour, each slice having a boundary divisible into a plurality of segments, each segment defining a curvature stored in the server 130. Empirical testing of virtual vehicles 101 with different curvatures can result in a correlation between deflection-to-force values and the curvature of the segment of the contour. The correlation can be normalized to a reference correlation to determine the nondimensional factor s, a value between 0 and 1, that describes a relative deflection-to-force value for a specified curvature.

The computer 105 can predict the damage based on an estimated force applied to the host vehicle 101. The computer 105 can collect data 115 about the target vehicle 200, such as a target vehicle 200 mass, speed, acceleration, etc., and can predict an amount of kinetic energy transferred to the host vehicle 101 and a predicted intrusion depth into the host vehicle 101, a distance into the host vehicle 101 the target vehicle 200 is predicted to move. The computer 105 can predict the intrusion depth based on conventional material deformation models and/or correlations based on collision simulations. The computer 105 can estimate the force by dividing the predicted energy transfer by the predicted intrusion depth. Alternatively, the computer 105 can estimate the force with a conventional correlation between energy transfer and material deformation.

The computer 105 can predict the damage to the host vehicle 101 based on a deformation characteristic. The deformation characteristic represents a portion of the energy transfer resulting from material deformation of the host vehicle 101. The deformation characteristic is based on a number of layers of material of the vehicle body 205 at the collision location 210, a yield strength of the material of the vehicle body 205 at the collision location 210, a ductility of the material, and the shape of the vehicle body 205 at the collision location 210. For example, the deformation characteristic δ can be:

$$\delta = A_1 L^{\alpha_1} + A_2 \sigma_y^{\alpha_2} + A_3 D^{\alpha_3} + A_4 s^{\alpha_4} \quad (1)$$

where L is a number of layers of material at the collision location 210, $\sigma_y$ is a yield strength of the material at the collision location 210, D is a ductility of the material at the collision location 210 (i.e., a measure of deformation upon exceeding the yield strength such as necking elongation and area reduction from necking), s is a nondimensional factor that is based on the shape of the vehicle body 205 at the collision location 210, as described above, and $A_1$, $A_2$, $A_3$, $A_4$, $\alpha_1$, $\alpha_2$, $\alpha_3$, $\alpha_4$ are empirically determined coefficients and exponents based on empirical test data of collisions between test vehicles 101, 200 and/or simulation collision testing of virtual vehicles 101, 200. The empirical testing can include a plurality of test collisions, measuring deformation of the test vehicles 101, 200, and performing statistical regression on the number of layers, yield strength, ductility, and shape of the material of the vehicles 101, 200 to determine the coefficients. The computer 105 can assign a plurality of zones to the vehicle body 205, each zone corresponding to a respective range of values of δ. For example, the computer 105 can assign 5 zones with numbers 1-5, the zone numbered 1 corresponding to deformation characteristics from 1 down to a first threshold, the zone numbered 5 corresponding to deformation characteristics below a second threshold, and zones numbered 2-4 corresponding to ranges of deformation characteristics between the first threshold and the second threshold. The thresholds can be determined as substantially even distributions of empirically determined deformation characteristics δ, i.e., upon performing the collision testing for the test vehicles 101, 200, the resultant deformation characteristics δ can be divided into a plurality substantially even ranges, each range assigned to one of the zones. Then, upon determining a deformation characteristic δ for a predicted collision, the computer 105 can assign the zone corresponding to the range that includes the determined deformation characteristic δ. For example, the empirical and/or simulation testing can identify a maximum deformation characteristic $\delta_{max}$ and can normalize deformation characteristic δ data according to the maximum deformation characteristic $\delta_{max}$, generating a set of normalized deformation characteristic $\tilde{\delta}$ data between 0 and 1. The zones 1-5 can be assigned as ranges between 0-1 of the normalized deformation characteristic $\tilde{\delta}$, e.g., zone 5 is all values less than 0.2, zone 4 is greater than or equal to 0.2 and less than 0.4, zone 3 is greater than or equal to 0.4 and less than 0.6, zone 2 is greater than or equal to 0.6 and less than 0.8, and zone 1 is greater than or equal to 0.8. Alternatively, different thresholds for the normalized deformation characteristic $\tilde{\delta}$ can be used to assign the zones.

The computer 105 can predict the damage to the host vehicle 101 based on a damage severity of the collision. The damage severity represents a portion of the energy transfer resulting from the difference in masses and speeds of the host vehicle 101 and the target vehicle 200. The damage severity is based on a difference in a speed of the host vehicle 101 and the speed of the target vehicle 200, the predicted contact area of the collision location 210, and the mass of the target vehicle 200. For example, the damage severity ε can be:

$$\varepsilon = B_1 \Delta v^{\beta_1} + B_2 \zeta^{\beta_2} + B_3 m^{\beta_3} \quad (2)$$

where Δv is the difference in the speeds between the host vehicle 101 and the target vehicle 200, ζ is the predicted contact area at the collision location 210, m is the mass of the target vehicle 200, and $B_1$, $B_2$, $B_3$, $\beta_1$, $\beta_2$, $\beta_3$ are empirically determined coefficients and exponents based on empirical test data of collisions between test vehicles 101, 200. The empirical testing can include a plurality of test collisions, measuring deformation of the test vehicles 101, 200, and performing statistical regression on the speeds, contact area of collision locations, and masses of the vehicles 101, 200 to determine the coefficients. The computer 105 can assign a plurality of severity ratings to the vehicle body 205, each zone corresponding to a respective range of values of ε. For example, the computer 105 can assign 5 severity ratings with numbers 1-5, the zone numbered 1 corresponding to damage severities from 0 up to a first threshold, the zone numbered 5 corresponding to damage severities above a second threshold, and zones numbered 2-4 corresponding to ranges of damage severities between the first threshold and the second threshold. The thresholds can be determined as substantially even distributions of empirically determined damage severities ε, i.e., upon performing the collision testing for the test vehicles 101, 200, the resultant damage severities ε can be divided into a plurality substantially even ranges, each range assigned to one of the zones. Then, upon determining a damage severity ε for a predicted collision, the computer 105 can assign the zone corresponding to the range that includes the determined damage severity ε. Incorporating the data 115 from the host vehicle 101 and the target vehicle 200 to the specific deformation characteristic δ and the damage severity ε improves damage prediction for components 120 of the host vehicle 101.

The computer 105 can predict a penetration depth 215 of the target vehicle 200 based on the energy transfer. The "penetration depth" 215 is a predicted depth into the host vehicle 101 that the target vehicle 200 is predicted to reach during the collision. The computer 105 can predict the penetration depth as a multiplication of the zone corresponding to the portion of the vehicle body 205 at the collision location 210 and the severity rating associated with the target vehicle 200. That is, the penetration depth can be associated with a specific multiple of the zone and the severity rating, e.g., the penetration depth can be 10 for a zone assigned the number 2 and a severity rating assigned the number 5. That is, the penetration depth can be associated with a range of distances that the target vehicle 200 is predicted to reach during the collision that can be empirically determined based on collision testing of vehicles 101, 200. The penetration depth can be normalized based on a maximum penetration depth, i.e., an empirically predicted maximum penetration depth of the target vehicle 200. That is, the normalized penetration depth is a value between 0 and 1 that is a ratio of the predicted zone multiplied by the predicted damage severity and divided by the maximum penetration depth. Based on the normalized penetration depth, the computer 105 can predict damage to components 120 of the host vehicle 101.

The computer 105 can generate depth lines 220 based on the normalized penetration depths. The "depth lines" are predicted distances into the host vehicle 101 that the target vehicle 200 would reach during a collision associated with and perpendicular to the penetration depths 215. While the depth lines 220 are illustrated as straight lines in a two-dimensional plane represented by the plan view of the host vehicle 101 in FIG. 2, the depth lines 220 can represent a plane in three-dimensional space and/or can include curves or nonlinear steps based on the deformation characteristic δ. For example, portions of the host vehicle 101 with lower deformation characteristics δ resist deformation during the collision, and the depth lines 220 can be closer to the edge of the host vehicle 101 because the corresponding penetration depths 215 would be lower. The computer 105 can identify one or more components 120 in the host vehicle 101 associated with the depth lines 220. For example, at a first depth line 220a that is associated with a first normalized penetration depth 215a, the target vehicle 200 can be predicted to contact a first component 120a at the collision location 210. In another example, at a second depth line 220b associated with a second normalized penetration depth 215b, the target vehicle 200 can be predicted to contact the first component 120a and a second component 120b at the collision location 210. That is, each depth line 220 can be associated with specific components 120 in the host vehicle 101 crossing the line and/or plane represented by the depth line 220. The computer 105 can generate depth lines 220 for different directions of collisions. For example, the first depth line 220a associated with the first normalized penetration depth 215a is shown in FIG. 2 both along a side of the host vehicle 101 and along a front end of the host vehicle 101. That is, during a side collision, the first depth line 215a along the side of the host vehicle 101 identifies components 120 that could be damaged, and in a front collision, the first depth line 215a along the front of the host vehicle identifies components 120 that could be damaged. The computer 105 can identify the direction of the collision based on the predicted trajectory of the target vehicle 200, as described above. The identification of the specific components 120 corresponding to collision locations 210 based on analyzing depth lines 220 and penetration depths 215 generated by the computer 105 as disclosed herein provides for improved identification of components 120 damages in a collision.

The computer 105 can identify one or more users, i.e., passengers and/or operators, of the host vehicle 101. The computer 105 can actuate one or more sensors 110 to collect data 115 about the users in the host vehicle 101. For example, the computer 105 can actuate a camera 110 and/or a weight sensor 110 to detect the users. The computer 105 can compare locations of the users in the host vehicle 101 to the collision location 210 and the depth lines 220 to determine whether a specific user may require additional attention from, e.g., emergency service providers. For example, the computer 105 can identify a user that is a closest distance to the collision location 210 and can transmit a message to the server 130 indicating the user, and emergency service providers can receive a message including the identified user from the server 130.

The computer 105 can predict a hazard for a user of the host vehicle 101 based on the predicted damage of at least one of the components 120 disposed at the collision location. In this context, a "hazard" is a classification of a scenario that may cause harm to the user. By classifying the hazards associated with damaged components 120, the user can address or avoid the hazards. Classifying the hazards provides improved avoidance of harm to the user that may not otherwise know what hazards would exist after the collision.

The computer 105 can predict a slip hazard. In this context, a "slip" hazard is classified as a hazard that can cause the user to lose balance because a surface has a substance that has a lower friction coefficient than typically required to maintain balance. The computer 105 can identify the slip hazard upon identifying that one of the damaged components 120 includes a lubricant, e.g., oil, grease, etc., or other substances that, when applied to a surface, have a friction coefficient that could cause the user to slip. For example, the substance can be, e.g., brake fluid, liquid fuel, water, transmission fluid, etc. The computer 105 can identify the slip hazard upon predicting that one of the damaged components 120 is, e.g., a brake, an internal combustion engine, etc.

The computer 105 can predict a fire hazard. In this context, a "fire" hazard is classified as a hazard that can cause a fire. The computer 105 can identify the fire hazard upon identifying that one of the damaged components 120 includes a combustible substance. Example combustible substances include, e.g., liquid fuel such as gasoline, ethanol, diesel, etc., brake fluid, transmission fluid, engine coolant, steering fluid, etc. The computer 105 can identify the fire hazard upon predicting that one of the damaged components 120 is, e.g., a fuel tank, an internal combustion engine, a fuel line, etc.

The computer 105 can predict an electrocution hazard. In this context, an "electrocution" hazard is classified as a hazard that can electrocute the user. The computer 105 can identify the electrocution hazard upon identifying that one of the damaged components 120 is an electronic component that can supply electricity on contact, e.g., a battery, a capacitor, etc.

The computer 105 can predict a respiratory hazard. In this context, a "respiratory" hazard is classified as a hazard that produces harmful inhalants that the user can inhale. The computer 105 can identify the respiratory hazard upon identifying that one of the damaged components 120 includes a volatile chemical, i.e., a substance that evaporates at typical ambient temperatures, and/or the damaged component 120 would generate inhalants, e.g., smoke, propellants, etc.

The computer 105 can collect image data 115 of cargo in the host vehicle 101. As used herein, the term "cargo" refers to any physical object that can be transported by a transportation vehicle as disclosed herein. The cargo can include substances that, if damaged, can cause a hazard. For example, if the cargo includes slippery substances such as oil, the damaged cargo can cause a slip hazard. The computer 105 can identify the cargo based on the image data 115, e.g., using an image-recognition algorithm such as a machine learning program. The computer 105 can identify the hazard based on the cargo at the collision location. For example, if the cargo includes a flammable substance, e.g., methanol, acetone, propane, etc., the computer 150 can identify a fire hazard when the cargo is predicted to be damaged.

The computer 105 can generate a list of one or more components 120 to repair based on the predicted damage at the collision location. Upon identifying the collision location and the predicted depth, the computer 105 identifies components 120 at the collision location that are predicted to be damaged in the collision. The computer 105 generates a list of the predicted damaged components 120. The list can include the identified hazards.

The computer 105 can transmit the message with indicating the predicted damage to the components 120 and the predicted hazards to a server 130 over the network 125. The server 130 can store the message in a profile assigned to the host vehicle 101. The server 130 can transmit the profile indicating the predicted damage to the components 130 and the hazards associated with the collision. For example, the server 130 can transmit the profile to, e.g., service vehicles, emergency service providers, a repair location, users of nearby vehicles 101, etc. Thus, users who may need information regarding the damage to the components 120 and the hazards can receive the information from the profile sent by the server 130. For example, a service worker at a repair location can request the profile to determine which components 120 to repair. In another example, users of nearby vehicles can request the profile to determine the hazards to avoid at the collision of the host vehicle 101 and the target vehicle 200. In another example, an emergency service provider can compare the hazard to hazardous material regulations of a local municipality to determine corrective action and attention by the emergency service provider.

Figure 3:
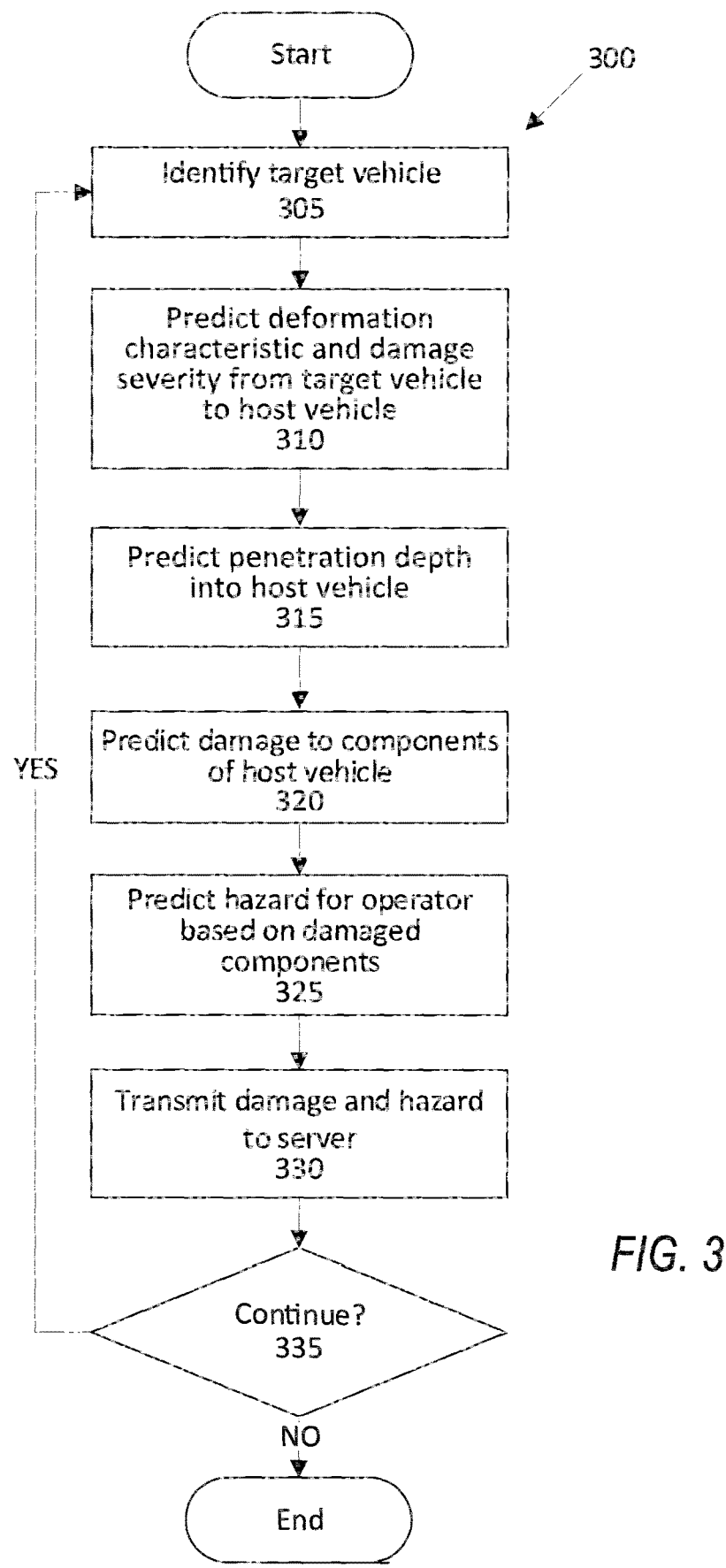
FIG. 3 is a block diagram of an example process for collision detection.

FIG. 3 is a block diagram of an example process 300 for collision detection. The process 300 begins in a block 305, in which a computer 105 of a host vehicle 101 detects a target vehicle 200. As described above, the computer 105 can identify the target vehicle 200 by, e.g., collecting data 115 from one or more sensors 110, receiving data 115 via a V2V communication, etc. For example, the computer 105 can identify the target vehicle 200 based on image data 115 collected by one or more cameras 110 and applying a conventional image-processing algorithm. The computer 105 can identify features of the target vehicle 200 that can identify the target vehicle 200, e.g., a grill, a brand marking, etc.

Next, in a block 310, the computer 105 predicts a deformation characteristic and a damage severity representative of an energy transfer from the target vehicle 200 to the host vehicle 101 is a collision. The computer 105 can, based on a speed of the target vehicle 200, the mass of the host vehicle 101, an area of a predicted collision location, and a deformation strength of material at the collision location, predict an energy transfer with a kinematic model, as described above. The deformation characteristic and the damage severity represent the energy transfer between the target vehicle 200 and the host vehicle 101.

Next, in a block 315, the computer 105 predicts a penetration depth 215 into the host vehicle 101. As described above, the penetration depth 215 is a predicted depth into the host vehicle 101 that the target vehicle 200 is predicted to reach during the collision. The computer 105 can predict the penetration depth as a multiplication of the zone corresponding to the portion of the vehicle body 205 at the collision location 210 and the severity rating associated with the target vehicle 200.

Next, in a block 320, the computer 105 predicts damage to one or more components 120 of the host vehicle 101. The computer 105 can identify one or more components 120 at a depth line 220 corresponding (and perpendicular) to the penetration depth 215 to the components 120. The depth lines 220 are predicted distances into the host vehicle 101 that the target vehicle 200 would reach during a collision associated with the penetration depths 215. The computer 105 can identify the components 120 at the depth line 220 as components 120 that are predicted to be damaged during the collision.

Next, in a block 325, the computer 105 predicts a hazard for a user of the host vehicle 101 based on the damaged components 120. The hazard is a classification of a scenario that may cause harm to a user. As described above, the computer 105 can classify at least one of a slip hazard, a fire hazard, an electrocution hazard, or a respiratory hazard based on the components 120 at the penetration depth 215. For example, the computer 105 can identify a fire hazard upon detecting a combustible substance in one of the damage components 120, e.g., a liquid fuel tank.

Next, in a block 330, the computer 105 transmits the predicted damaged components 120 and the predicted hazards to a server 130 over a network 125. The server 130 can store a list of transmitted damaged components 120 and hazards in a profile associated with the host vehicle 101. Users can request the profile to address the damaged components 120 and hazards. For example, a service worker at a repair location can request the profile to identify the damaged components 120 for repair.

Next, in a block 335, the computer 105 determines whether to continue the process 300. For example, the computer 105 can determine not to continue the process 300 after a collision has occurred. If the computer 105 determines to continue, the process 300 returns to the block 305. Otherwise, the process 300 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computing devices discussed herein, including the computer 105 and server 130, include processors and memories, the memories generally each including instructions executable by one or more computing devices such as those identified above, and for carrying out blocks or steps of processes described above. Computer executable instructions may be compiled or interpreted from computer programs created using a variety of programming languages and/or technologies, including, without limitation, and either alone or in combination, Java™, C, C++, Visual Basic, Java Script, Python, Perl, HTML, etc. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in the computer 105 is generally a collection of data stored on a computer readable medium, such as a storage medium, a random access memory, etc.

A computer readable medium includes any medium that participates in providing data (e.g., instructions), which may be read by a computer. Such a medium may take many forms, including, but not limited to, non volatile media, volatile media, etc. Non volatile media include, for example, optical or magnetic disks and other persistent memory. Volatile media include dynamic random access memory (DRAM), which typically constitutes a main memory. Common forms of computer readable media include, for example, a floppy disk, a flexible disk, hard disk, magnetic tape, any other magnetic medium, a CD ROM, DVD, any other optical medium, punch cards, paper tape, any other physical medium with patterns of holes, a RAM, a PROM, an EPROM, a FLASH EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 300, one or more of the steps could be omitted, or the steps could be executed in a different order than shown in FIG. 3. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
   proactively predict damage to one or more components of a host vehicle based on a predicted energy transfer between a target vehicle and the host vehicle, the energy transfer based on a speed of the target vehicle, a mass of the target vehicle, a predicted contact area of a collision location of the host vehicle where the target vehicle is predicted to collide, and a deformation strength of material at the collision location;
   predict a hazard for a user of the host vehicle based on the predicted damage of at least one of the components disposed at the collision location; and
   send a message indicating the predicted damage and the predicted hazard to a server accessible to emergency services providers,
   wherein the instructions further include instructions to determine a deformation characteristic based on a number of layers of material of a vehicle body of the host vehicle at the collision location, a yield strength of the material, a ductility of the material, and a shape of the vehicle body defined as a set of dimensions including at least a length, a width, a cross-section, and a material thickness of the vehicle body at the collision location, and to predict the damage based on the deformation characteristic.

2. The system of claim 1, wherein the instructions further include instructions to identify the hazard as one of a slip hazard, an electrocution hazard, or a respiratory hazard.

3. The system of claim 2, wherein the instructions further include instructions to identify the slip hazard upon identifying that one of the damaged components includes a lubricant, to identify the electrocution hazard upon identifying that one of the damaged components is a battery, and to identify the respiratory hazard upon identifying that one of the damaged components includes a volatile chemical.

4. The system of claim 1, wherein the instructions further include instructions to identify a size of the target vehicle and to predict the damage based on the size of the target vehicle.

5. The system of claim 1, wherein the instructions further include instructions to generate a list of one or more components to repair based on the predicted damage at the collision location.

6. The system of claim 1, wherein the instructions further include instructions to identify the target vehicle based on image data collected by a camera of the host vehicle and to determine the mass of the target vehicle based on the identification.

7. The system of claim 1, wherein the instructions further include instructions to predict a penetration depth of the target vehicle based on the predicted energy transfer.

8. The system of claim 1, wherein the instructions further include instructions to collect image data of cargo in the host vehicle and to identify the hazard based on the cargo.

9. The system of claim 1, wherein the instructions further include instructions to predict a damage severity based on a difference in a speed of the host vehicle and the speed of the target vehicle, the predicted contact area of a collision location of the host vehicle where the target vehicle is predicted to collide, and the mass of the target vehicle, and to predict a penetration depth of the target vehicle based on the deformation characteristic and the damage severity.

10. The system of claim 9, wherein the instructions further include instructions to identify one or more damaged components based on the penetration depth.

11. A method, comprising:
    proactively predicting damage to one or more components of a host vehicle based on a predicted energy transfer between a target vehicle and the host vehicle, the energy transfer based on a speed of the target vehicle, a mass of the target vehicle, a predicted contact area of a collision location of the host vehicle where the target vehicle is predicted to collide, and a deformation strength of material at the collision location;
    predicting a hazard for a user of the host vehicle based on the predicted damage of at least one of the components disposed at the collision location; and sending a message indicating the predicted damage and the predicted hazard to a server accessible to emergency services providers, wherein the method further includes determining a deformation characteristic based on a number of layers of material of a vehicle body of the host vehicle at the collision location, a yield strength of the material, a ductility of the material, and a shape of the vehicle body defined as a set of dimensions including at least a length, a width, a cross-section, and a material thickness of the vehicle body at the collision location, and to predict the damage based on the deformation characteristic.

12. The method of claim 11, further comprising identifying the hazard as one of a slip hazard, an electrocution hazard, or a respiratory hazard.

13. The method of claim 11, further comprising predicting a penetration depth of the target vehicle based on the predicted energy transfer.

14. A system, comprising:
a host vehicle including a plurality of components;
means for proactively predicting damage to one or more of the components based on a predicted energy transfer between a target vehicle and the host vehicle, the energy transfer based on a speed of the target vehicle, a mass of the target vehicle, a predicted contact area of a collision location of the host vehicle where the target vehicle is predicted to collide, and a deformation strength of material at the collision location;
means for predicting a hazard for a user of the host vehicle based on the predicted damage of at least one of the components disposed at the collision location; and
means for sending a message indicating the predicted damage and the predicted hazard to a server accessible to emergency services providers,
wherein the instructions further include instructions to determine a deformation characteristic based on a number of layers of material of a vehicle body of the host vehicle at the collision location, a yield strength of the material, a ductility of the material, and a shape of the vehicle body defined as a set of dimensions including at least a length, a width, a cross-section, and a material thickness of the vehicle body at the collision location, and to predict the damage based on the deformation characteristic.

15. The system of claim 14, further comprising means for identifying the hazard as one of a slip hazard, an electrocution hazard, or a respiratory hazard.

16. The system of claim 14, further comprising means for predicting a penetration depth of the target vehicle based on the predicted energy transfer.

* * * * *